(12) United States Patent
Inoue et al.

(10) Patent No.: US 6,549,498 B1
(45) Date of Patent: Apr. 15, 2003

(54) OPTICAL DISK AND OPTICAL DISK APPARATUS

(75) Inventors: Takashi Inoue, Osaka (JP); Eiji Ueda, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 97 days.

(21) Appl. No.: 09/831,323

(22) PCT Filed: Sep. 7, 2000

(86) PCT No.: PCT/JP00/06115
§ 371 (c)(1),
(2), (4) Date: May 7, 2001

(87) PCT Pub. No.: WO01/20603
PCT Pub. Date: Mar. 22, 2001

(30) Foreign Application Priority Data

Sep. 10, 1999 (JP) .......................................... 11-256687

(51) Int. Cl.[7] ................................................. G11B 7/00
(52) U.S. Cl. ................ 369/47.28; 369/59.1; 369/275.4; 369/44.26
(58) Field of Search ............................. 369/47.1, 47.15, 369/47.21, 47.28, 53.1, 53.34, 59.1, 59.19, 59.25, 275.1, 275.4, 44.26

(56) References Cited

U.S. PATENT DOCUMENTS 4,959,823 A 9/1990 Getreuer et al.
5,070,492 A * 12/1991 Ogawa et al. ............ 369/47.28
5,073,880 A * 12/1991 Maeda et al. ............ 369/44.26
5,894,463 A * 4/1999 Okawa et al. ........... 369/44.26

FOREIGN PATENT DOCUMENTS

| JP | 2-114722 | 4/1990 |
| JP | 2-141970 | 5/1990 |
| JP | 3-95736 | 4/1991 |
| JP | 6-150556 | 5/1994 |
| JP | 8-115523 | 5/1996 |
| JP | 10-320784 | 12/1998 |
| JP | 11-190818 | 7/1999 |
| JP | 11-273123 | 10/1999 |
| JP | 11-316963 | 11/1999 |
| JP | 2000-339694 | 12/2000 |
| JP | 2000-339872 | 12/2000 |

OTHER PUBLICATIONS

International Search Report for PCT/JP00/06115, Dec. 19, 2000.

* cited by examiner

Primary Examiner—Muhammad Edun
(74) Attorney, Agent, or Firm—Merchant & Gould P.C.

(57) ABSTRACT

An optical disc in a sample servo format applicable to high density recording in which a control track area is formed without reducing format efficiency of a rewritable track area and an optical disc device that can read out control information in a short time with a simple circuit configuration are provided. For this purpose, in the optical disc, a space of a predetermined length where emboss prepits do not exist is arranged for each segment in the control track area, following a data area where control data are recorded by emboss prepits as a clock mark, wobble marks and an address mark.

7 Claims, 5 Drawing Sheets

OPTICAL DISK AND OPTICAL DISK APPARATUS

TECHNICAL FIELD

The present invention relates to an optical disc in a sample servo format and an optical disc device.

BACKGROUND ART

In recent years, as media to record information optically, an optical disc, an optical card, an optical tape and so forth are proposed and developed. Among them, the optical disc is drawing attention as a medium that can record and reproduce information in a large capacity and of high density.

As for an optical disc capable of recording and reproduction, a magneto-optical (MO) disc is generally known. With regard to the optical disc system for performing recording and reproduction of various data by scanning concentric circular or spiral tracks formed on such an optical disc with a laser beam, corresponding to its rotation system, there are a ZCLV system, which performs recording and reproduction of data by dividing a recording area into zones including a predetermined number of tracks, reducing the number of revolutions in the optical disc stepwise moving from an inner circumferential zone to an peripheral zone, along with the movement of an optical pickup portion that shifts from the inner circumference to the periphery of the optical disc with an increased number of sectors per one circle (here, the number of revolution in each zone is constant), and allowing the linear velocity over the entire disc circle to be substantially constant, and a ZCAV system, which performs recording and reproduction of data by rotationally driving an optical disc with its recording area also divided into zones while maintaining a constant angular velocity.

Furthermore, an optical disc and an optical disc device in a continuous servo format, which performs a tracking control etc. by using pre-groups provided continuously along tracks, and an optical disc and an optical disc device in a sample servo format, which performs a tracking control etc. by using prepits in a servo area scattered on tracks, are known.

As an example of a conventional optical disc in the above-mentioned sample servo format, JP8(1996)-115523A describes an optical disc in which media information is recorded by the gray code in data areas of control tracks located in the vicinity of an inner circumferential end and in the vicinity of a peripheral end, and in a servo area of each segment, an identification mark providing information for distinguishing this segment by the recorded position within the servo area is formed together with two wobble pits used for tracking control etc. as three prepits. Then, an optical disc drive confirms whether the various pit patterns reproduced from the above-mentioned optical disc match the pit patterns in the predetermined servo areas, and thus, a rotational phase of the optical disc is synchronized with the phase of a servo clock. By using this servo clock, the position of the above-mentioned identification mark is read out to identify the segment, and at the same time, control information is obtained by reading out the media information recorded by the gray code.

Furthermore, as an example of a conventional disc not provided with the prepits as mentioned above but with pre-groups, JP10(1998)-320784A describes an optical disc in which a control track mark serving as a synchronization signal for a control track area and control information representing parameter information of a disc are recorded in the control track area by forming wobbles in a guide groove of each track, and a servo synchronization signal serving as a synchronization signal for a user area and address information of this sector are recorded in the user area etc., and a clock mark is formed in the guide groove.

However, the problem with the optical disc that specifies the servo area by confirming that the pit patterns reproduced by the optical disc drive match with each other for the three pits including the identification mark of different recording positions depending on the identification information of the segment and the two wobble pits, is that redundancy increases in a rewritable track area, which is a user area enabling writing.

Furthermore, a drive for this type of optical disc must obtain the control information by synchronizing the rotational phase of the optical disc with the phase of the servo clock by detecting whether the pit patterns match with each other in the servo area, identifying the segment by reading the position of the above-mentioned identification mark using this servo clock, and also reading the media information recorded by the gray code. Therefore, the circuit configuration for detecting whether the pit patterns are matched becomes complicated. At the same time, it takes time until the servo clock comes to a phase lock, and thus it is difficult to read out the control information in a short time.

Furthermore, in the case of the above-mentioned optical disc, in which not only the wobbles containing the synchronization signals and the control information or the address information independent of each other but also the clock mark are formed in the guide groove of the respective tracks, the optical disc is not only incompatible with the sample servo format but also difficult to be applied to high density recording by narrowing the track pitch.

DISCLOSURE OF THE INVENTION

Therefore, it is an object of the present invention to provide an optical disc in a sample servo format applicable to high density recording, in which a control track area is formed without reducing format efficiency of a rewritable track area, and also to provide an optical disc device that can read out control information in a short time with a simple circuit configuration.

To achieve the above object, an optical disc of the present invention is characterized in that a plurality of concentric circular or spiral tracks are formed in a control track area where control data are recorded, in the vicinity of at least one selected from an inner circumferential end and a peripheral end, and in a rewritable area located outside the control track area for recording user data at least in one direction selected from an inner circumference to a periphery and from the periphery to the inner circumference depending on the position of the control track area, and that a plurality of segments are formed in each track, each segment including a clock area where a clock mark is arranged, a servo area where a pair of wobble marks displaced in inner circumferential and peripheral directions from a center line of a track and separated by a predetermined distance in a circumferential direction, an address area where an address mark is arranged and a data area for recording the control data or the user data, wherein the clock mark, the wobble marks and the address mark are formed as prepits of an uneven shape, and, following the data area where the control data are recorded by the prepits of an uneven shape, a space of a predetermined length where the prepits do not exist is arranged for each segment in the control track area.

According to the optical disc of the present invention, in the rewritable track area, the data area following the address area, in which prepits of an uneven shape (hereinafter referred to as emboss prepits) do not exist and the user data are recorded magneto-optically, functions as a space, and a first emboss prepit in a segment immediately after this space easily can be specified as a clock mark. Furthermore, in the control track area, a first emboss prepit in a segment immediately after the space following the data area, where the emboss prepits exist and thus the control data are recorded, easily can be specified as a clock mark.

Therefore, the emboss prepits in the clock area, the servo area and the address area of each segment are not required to be arranged in unique patterns, and redundancy is not increased. As a result, the format efficiency in the rewritable track area can be enhanced.

In the optical disc of the present invention, it is preferable that the same control data are recorded in a plurality of tracks neighboring in the control track area.

According to this configuration, the emboss prepits of the control data are arranged identically in the radial direction, so that an optical disc device can read out the control data only by performing a focus control, without performing a tracking control of tracing the tracks precisely. As a result, the readout of the control data can be completed in a short time Furthermore, in the optical disc of the present invention, it is preferable that the control data in the control track area are recorded by the run-length-limited code.

According to this configuration, even when the control data to be recorded continuously become either a logic 1 or a logic 0, by coding the data using the run-length-limited code, the emboss prepits actually recorded as the control data do not continue, and the optical disc device does not erroneously detect it as a space, so that the clock mark can be detected surely.

Moreover, in the optical disc of the present invention, it is preferable that the predetermined length of the space is a length exceeding a distance between the servo mark and a first prepit of the control data in the control track area.

According to this configuration, when the predetermined length is a length exceeding a distance between the servo mark and the first prepit of the control data in the control track area, the length of the control data in each segment can be set variably.

In order to achieve the above object, an optical disc device of the present invention is an optical disc device for driving an optical disc, in which a plurality of concentric circular or spiral tracks are formed in a control track area where control data are recorded, in the vicinity of at least one selected from an inner circumferential end and a peripheral end, and in a rewritable area located outside the control track area for recording user data at least in one direction selected from an inner circumference to a periphery and from the periphery to the inner circumference depending on the position of the control track area, and a plurality of segments are formed in each track, each segment including a clock area where a clock mark is arranged, a servo area where a pair of wobble marks displaced in inner circumferential and peripheral directions from a center line of the track and separated by a predetermined distance in a circumferential direction, an address area where an address mark is arranged and a data area for recording the control data or the user data, wherein the clock mark, the wobble marks and the address mark are formed as prepits of an uneven shape, and, following the data area where the control data are recorded by the prepits of an uneven shape, a space of a predetermined length where the prepits do not exist is arranged for each segment in the control track area, and the optical disc device is characterized in that the optical disc device includes reproduction means for reproducing pit signals corresponding to the prepits, clock mark detection means for detecting a pit signal following a distance of not less than a distance corresponding to the space length from the pit signals reproduced by the reproduction means as the clock mark, servo clock generating means for generating a servo clock synchronized with the clock mark detected by the clock mark detection means and control data readout means for reading out the control data based on the servo clock.

According to the optical disc device of the present invention, with the use of the clock mark detection means, in the rewritable track area, a reproduced pit signal, which follows a distance after the address area corresponding to the length of the data area where the emboss prepits do not exist and the user data are recorded magneto-optically, can be detected as a clock mark, whereas in the control track area, a reproduced pit signal, which follows a distance corresponding to the length of the space following the data area where the emboss prepits exist and thus the control data are recorded, can be detected as a clock mark. As a result, a servo clock having a phase synchronized with a clock mark, that is, with the rotation of the optical disc, can be generated easily.

Therefore, for generation of a servo clock, it is no longer necessary as conventionally to arrange the emboss prepits in the clock area, the servo area and the address area of each segment in unique patterns and to achieve a phase synchronization of a servo clock by matching the patterns of the reproduced pit signals with the unique patterns, so that a pull-in speed of a phase lock can be improved with a simple circuit configuration.

It is preferable that the optical disc device of the present invention further includes tracking control means for controlling a center of an optical beam spot to be emitted on the optical disc to match a center line of a track, based on the results of the pair of wobble pits reproduced by the reproduction means and servo control means for setting the tracking control means in a non-operating state at the time when the control data is read out by the control data readout means, wherein the same control data are recorded in a plurality of tracks neighboring in the control track area of the optical disc.

According to this configuration, the emboss prepits of the control data are arranged identically in the radial direction, so that the optical disc device can read out the control data only by performing a focus control, without performing a tracking control of tracing the tracks precisely. As a result, the readout of the control data can be completed in a short time.

Furthermore, in the optical disc of the present invention, it is preferable that the control data in the control track area are recorded by the run-length-limited code, and that the control data readout means includes decoding means for decoding the control data recorded by the run-length-limited code.

According to this configuration, even when the control data to be recorded continuously become either a logic 1 or a logic 0, by coding the control data using the run-length-limited code, the emboss prepits actually recorded as the control data do not continue, and when they are reproduced as pit signals, the clock mark detection means does not erroneously detect it as a distance of not less than a space length, so that the clock mark can be detected surely.

BEST MODE FOR CARRYING OUT THE INVENTION

In the following, a preferable embodiment of the present invention will be explained based on the drawings. In addition, an optical disc used in the embodiment of the present invention is a magneto-optical disc in a sample servo format applicable to rotational systems of both the ZCLV system and the ZCAV system mentioned above.

Figure 1A:
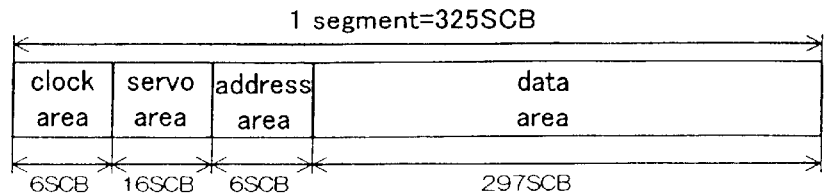
FIG. 1(a) is a schematic view showing the structure of a segment arrangement in a rewritable area of an optical disc according to an embodiment of the present invention.
Figure 1B:
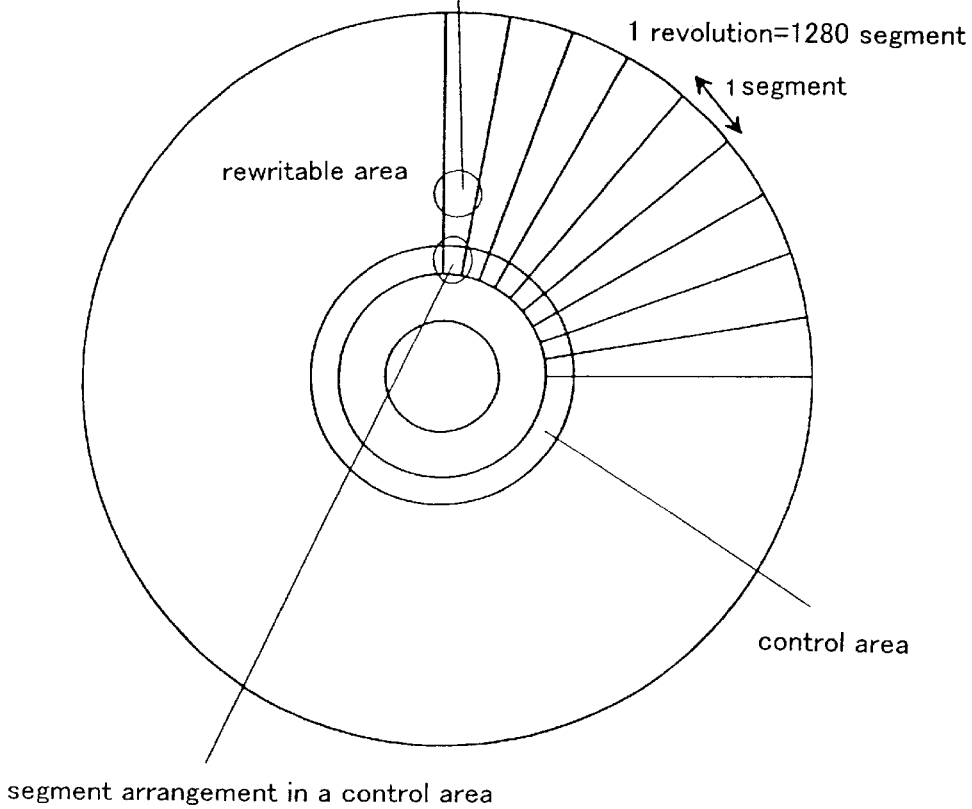
FIG. 1(b) is a plan view schematically showing the structure of segments in an optical disc according to an embodiment of the present invention.
Figure 1C:
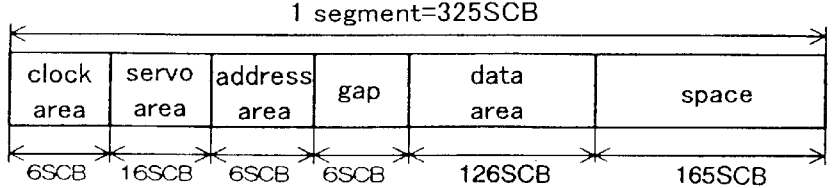
FIG. 1(c) is a schematic view showing the structure of a segment arrangement in a control area of an optical disc according to an embodiment of the present invention.

FIG. 1(a) to FIG. 1(c) are the structural views of segments in an optical disc according to an embodiment of the present invention. As shown in FIG. 1(b), a control track area where control data are recorded is provided in the vicinity of an inner circumferential end of the optical disc. The control data include, for example, generation information of media, vendor information of media, information of recording reproduction characteristics of a disc (laser power etc.), format information and so forth. Furthermore, a rewritable track area where user data are recorded and reproduced as magneto-optical signals is provided outside the control track area, covering the optical disc from the inner circumference to the periphery.

Each of the tracks in the rewritable track area and the control track area is divided into 1280 pieces of segments, and the layout of each segment is shown in FIG. 1(a) and FIG. 1(c) respectively.

As shown in FIG. 1(a) and FIG. 1(c), each segment includes a clock area, a servo area and an address area. In these areas, information expressed by marks of an uneven shape called pits, prepits or emboss prepits is recorded in advance. Hereinafter, the terms "pit" and "mark" are used with the same meaning. Here, a bit length and a numbering of information record are expressed by the number and the numbering of a servo channel bit (hereinafter referred to as a SCB) by taking one clock cycle of a servo clock as a unit, to be described later. As shown in the drawings, the clock area includes 6 SCB, and the servo area includes 16 SCB, and the address area includes 6 SCB.

A clock mark formed in the clock area includes one emboss prepit with its center positioned in the center line of a track, and, as will be described later, the clock mark is used for generating a servo clock SCLK in an optical disc device that drives optical discs.

Servo marks formed in the servo area includes a pair of wobble pits whose centers are displaced in inner circumferential and peripheral directions from the center line of a track by a half track pitch and which are separated by a predetermined distance in the circumferential direction, and, as will be described later, the servo marks are used in the optical disc device that drives optical discs for generating a tracking error signal TE, which is a difference between signal levels obtained from the centers of the two wobble pits.

An address mark formed in the address area includes one emboss prepit with its center positioned in the center line of a track, and address information of one sector can be obtained from address marks in 80 pieces of segments provided either with this emboss prepit (indicating bit "1") or without (indicating bit "0"). In other words, although it is not shown in the drawing, one sector includes 80 segments, and 16 sectors are formed in each track.

In addition to the clock area, the servo area and the address area, each segment in the rewritable track area includes a data area of 297 SCB where user data are recorded and reproduced as magneto-optical signals and emboss pits do not exist. On the other hand, each segment in the control track area includes a data area of 126 SCB where control data are recorded as emboss prepits.

Furthermore, each segment in the control track area includes a gap of 6 SCB between the address area and the data area. The reason for arranging this gap is, in the case where an emboss prepit exists in the address area (data "1") and when pit signals are reproduced by the optical disc device, to avoid a state in which correct information cannot be obtained as a result of the reproduced pit signals interfering with an optical beam spot focused on both the address mark and the first prepit of the control data.

Moreover, each segment in the control track area includes a space of 165 SCB where emboss prepits do not exist, following the data area where the control data are recorded by the emboss prepits. By arranging this space, an emboss prepit following a sufficiently long space easily can be specified as a clock mark of a clock area in the next segment. This also applies to each segment in the rewritable track area, and the data area where emboss pits do not exist and the user data are recorded and reproduced as magneto-optical signals can be regarded as the above-mentioned space, so that an emboss prepit following the data area easily can be specified as a clock mark of a clock area in the next segment.

As described above, the space length in each segment of the control track area was set as 165 SCB, but this space length can be increased or decreased according to the amount of data required as the control data to be recorded in the data area. However, the space length required for specifying a clock mark should be larger than a maximum distance among the distances between the clock mark, the servo mark, the address mark and the first prepit in the data area. In the case of the present embodiment, the space having a length that is larger than the distance between the servo mark and the first prepit in the data area at the time when the address mark is "0" (that is, a prepit does not exist) is required.

Figure 2:
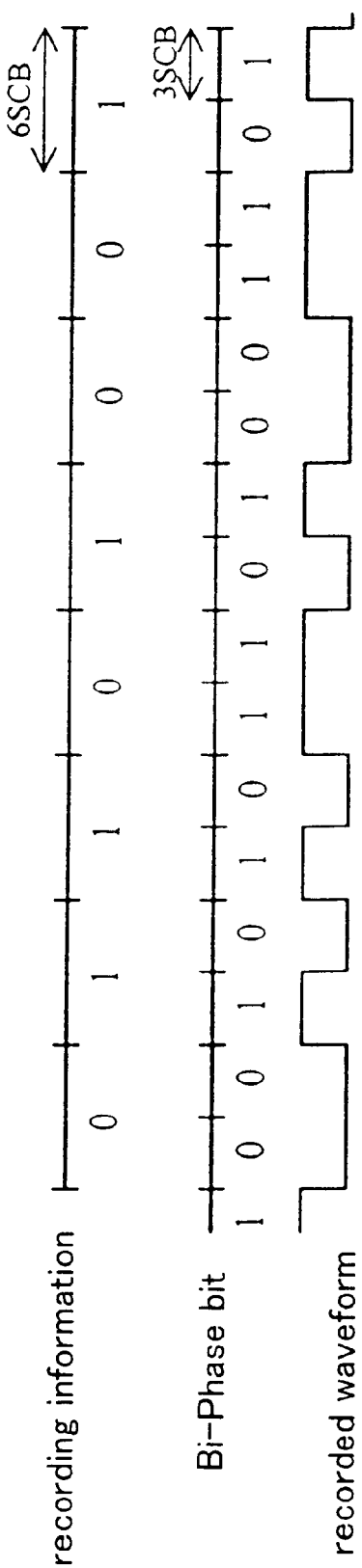
FIG. 2 is a waveform chart of control data recorded in the optical disc of FIG. 1.

Here, the control data to be recorded in fact have been encoded by the run-length-limited (RLL) code. This is done to exclude the possibility that the optical disc device will erroneously detect it as the space following the data area as mentioned above when a run exists in the control data, that is, when the control data to be recorded continuously become either a logic 1 or a logic 0. In the present embodiment, as the RLL code, the Bi-Phase code that can be decoded easily is used. FIG. 2 shows a waveform of the control data modulated by using the Bi-Phase code. As shown in FIG. 2, one bit of the control data as recording information includes 6 SCB, and the shortest mark of the actually recorded waveform that is modulated by the Bi-Phase code is 3 SCB.

In the present embodiment, the data area of 126 SCB is provided, and 6 SCB becomes 1-bit control data by the Bi-Phase code, so that 21-bit control data can be recorded per one segment. Therefore, the control data per 1 track (1 cycle) become 21 bits×1280=26880 bits. Naturally, when the amount of information required as the control data is smaller, the control data per one segment may be reduced from 21 bits. Furthermore, when a larger amount of information is required, the space length following the data area can be reduced to lengthen the data area, but in this case, as described above, the space length is required to exceed the distance between the servo mark and the first prepit of the data area.

In the present embodiment, exactly the same control data are recorded in the plurality of tracks neighboring in the control track area. Due to this configuration, the emboss prepits are arranged identically in the radial direction of the optical disc, so that the optical disc device that reproduces this optical disc can read out the control data only by performing a focus control, without performing a tracking control of positioning the center of the optical beam spot in the center line of the track precisely. As a result, the readout of the control data can be completed in a short time.

Next, an optical disc device that records and reproduces user data by driving the optical disc of the above-mentioned embodiment will be explained by referring to a magneto-optical disc device.

Figure 3:
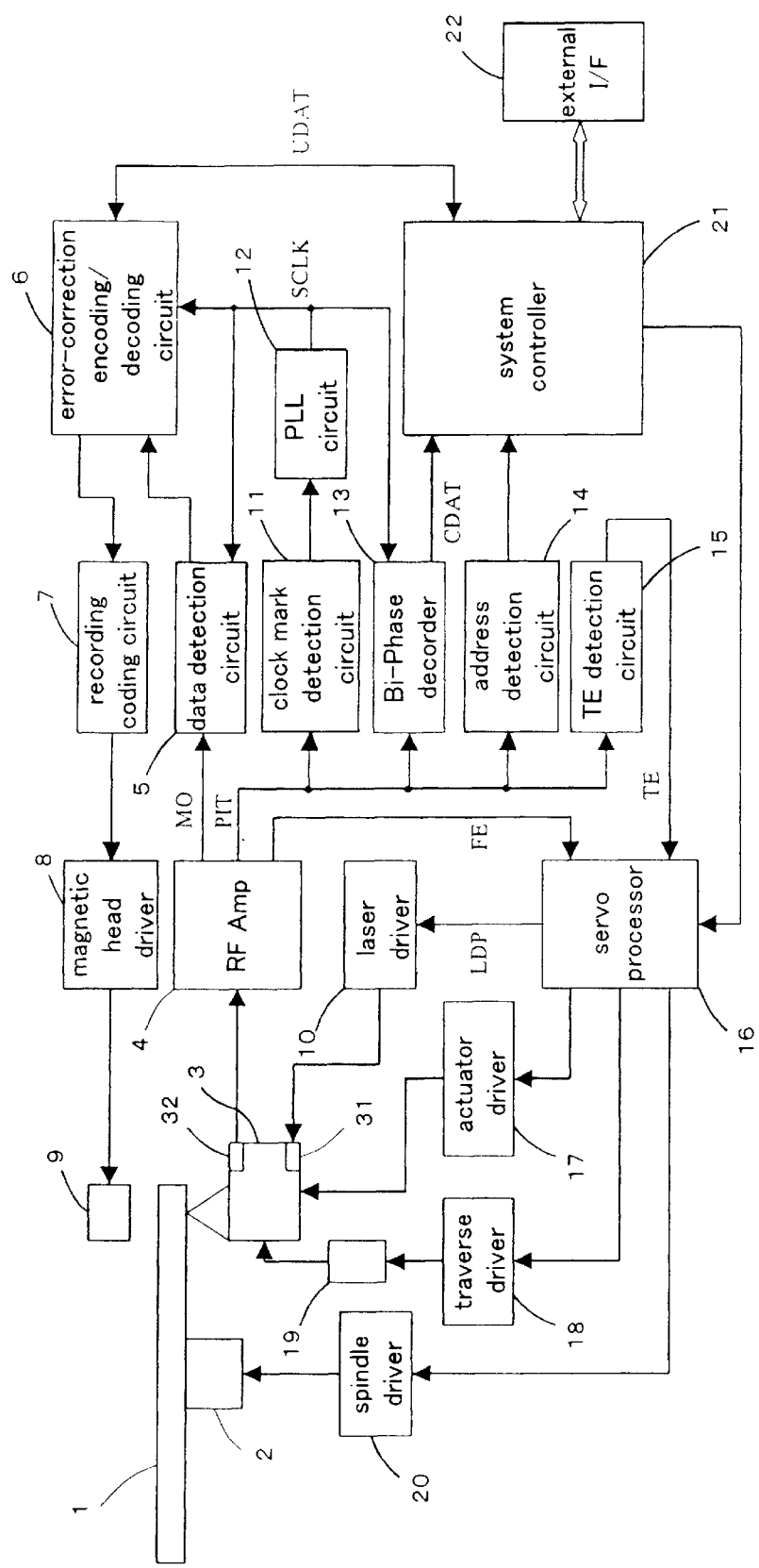
FIG. 3 is a block diagram showing the configuration of an optical disc device according to an embodiment of the present invention.

FIG. 3 is a block diagram showing the configuration of a magneto-optical disc device according to an embodiment of the present invention.

In FIG. 3, 1 is a magneto-optical disc, and 2 is a spindle motor for rotating the magneto-optical disc 1. 3 is an optical pickup (reproduction means), which not only focuses a light beam emitted from a built-in semiconductor laser 31 onto the magneto-optical disc 1, but also leads the light beam reflected from the magneto-optical disc 1 to a built-in photodetector 32 and outputs electric signals after conversion.

4 is a RF Amp (reproduction means), which amplifies and calculates the output signals from the optical pickup 3 for detection of a magneto-optical signal (MO), a pit signal (PIT) and a focus error signal (FE). 5 is a data detection circuit used for decoding the recorded information from the magneto-optical signal and transmitting it to an error-correction encoding/decoding circuit 6. The error-correction encoding/decoding circuit 6 performs an error-correction decoding process for the output signal from the data detection circuit 5 and transmits the data to an external interface (I/F) 22 via a system controller 21, and with regard to user data input from the external I/F 22 via the system controller 21, the error-correction encoding/decoding circuit 6 performs an error-correction coding process and transmits the data to a recording coding circuit 7. The recording coding circuit 7 converts the signals sent from the error-correction encoding/decoding circuit 6 into sequences of codes suitable for recording and transmits the recorded signals to a magnetic head driver 8. The magnetic head driver 8 sends a recording current, whose positivity and negativity is reversed according to the recorded signal, to a magnetic head 9, and the magnetic head 9 applies a recording magnetic field reversed by the recording current to the magneto-optical disc 1.

10 is a laser driver, and as will be explained later, the system controller 21 obtains recording laser power and reproduction laser power as information of recording reproduction characteristics from the control data (CDAT) read out by a Bi-Phase decoder 13 (control data readout means), and the recording laser power and the reproduction laser power are set in the laser driver 10 via a servo processor 16. When information is reproduced, the laser driver 10 performs a d.c. emission for the semiconductor laser 31 within the optical pickup 3 with the set reproduction power, and when information is recorded, the laser driver 10 performs a pulse emission for the semiconductor laser 31 with the set recording laser power through a servo clock (SCLK) fed from a PLL circuit 12 (servo clock generating means).

11 is a clock mark detection circuit (clock mark detection means) for detecting a clock mark from the pit signal (PIT) sent from the RF Amp 4. The PLL circuit 12 generates a servo clock (SCLK) synchronized with the clock mark detected by the clock mark detection circuit 11. 13 is the Bi-Phase decoder, which obtains control information through a Bi-Phase demodulation of the pit signal sent from the RF Amp 4, when the control data recorded in the control track area are reproduced. 14 is an address detection circuit, which picks an address mark out from the pit signal and decodes the address information. 15 is a tracking error (TE) detection circuit, which picks a pair of wobble marks out from the pit signal and outputs its difference value as a tracking error signal (TE).

The servo processor 16 regards the focus error signal (FE) sent from the RF Amp 4 or the tracking error signal (TE) sent from the TE detection circuit 15 as error information and performs a focus control of the optical beam by driving an objective lens actuator (not shown) within the optical pickup 3 in the direction parallel to the emitted direction of the optical beam via an actuator driver 17 or a tracking control of the optical beam by driving the objective lens actuator (tracking control means) in the direction parallel to the radial direction of the magneto-optical disc, also via the actuator driver 17. Furthermore, the servo processor 16 also performs a transposition control of the entire optical pickup 3 by driving a traverse motor 19 (tracking control means), which shifts the entire optical pickup 3 in the radial direction 17 via a traverse driver 18 (tracking control means), and a rotational drive of the magneto-optical disc 1 at a constant linear velocity (CLV) or at a constant angular velocity (CAV) by driving the spindle motor 2 via a spindle driver 20.

The system controller 21 reads out the control data (CDAT) sent from the Bi-Phase decoder 13 and sets, for example, the recording/reproduction laser power for the laser driver 10 as information of recording reproduction characteristics, or manages the transmission/reception of the user data with the external I/F 22 and the operation of the entire system.

Figure 4:
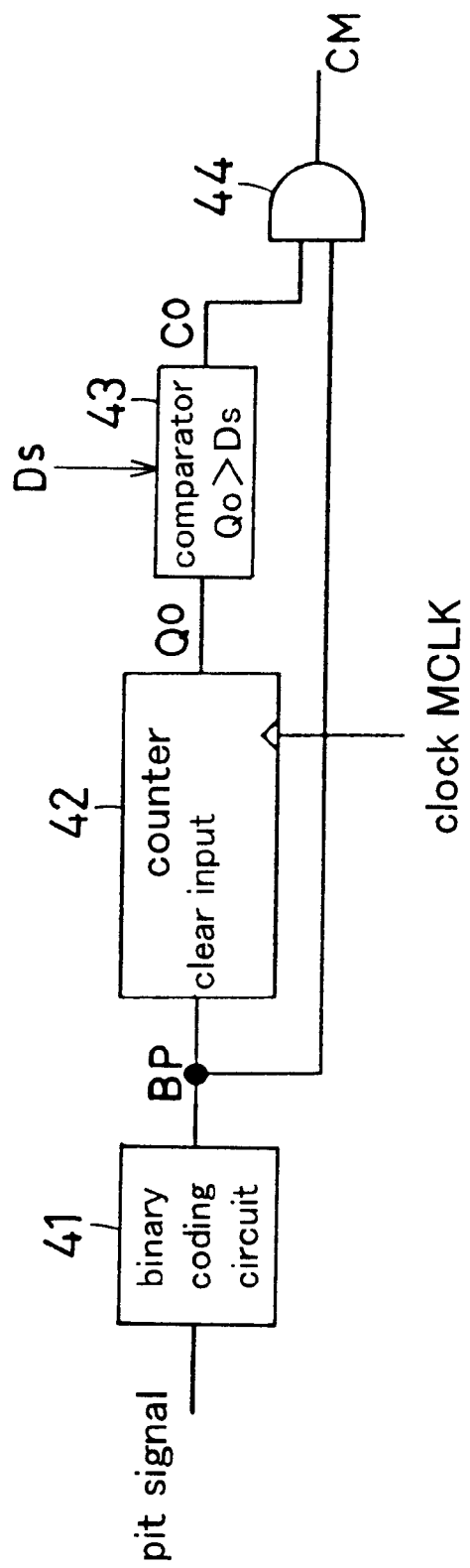
FIG. 4 is a detailed block diagram of a clock mark detection circuit shown in FIG. 3.

Next, the operation of detecting a clock mark by the clock mark detection circuit 11 will be explained by referring to a detailed block diagram of the clock mark detection circuit 11 shown in FIG. 4 and also to waveform charts of each part shown in FIG. 5.

Figure 5:
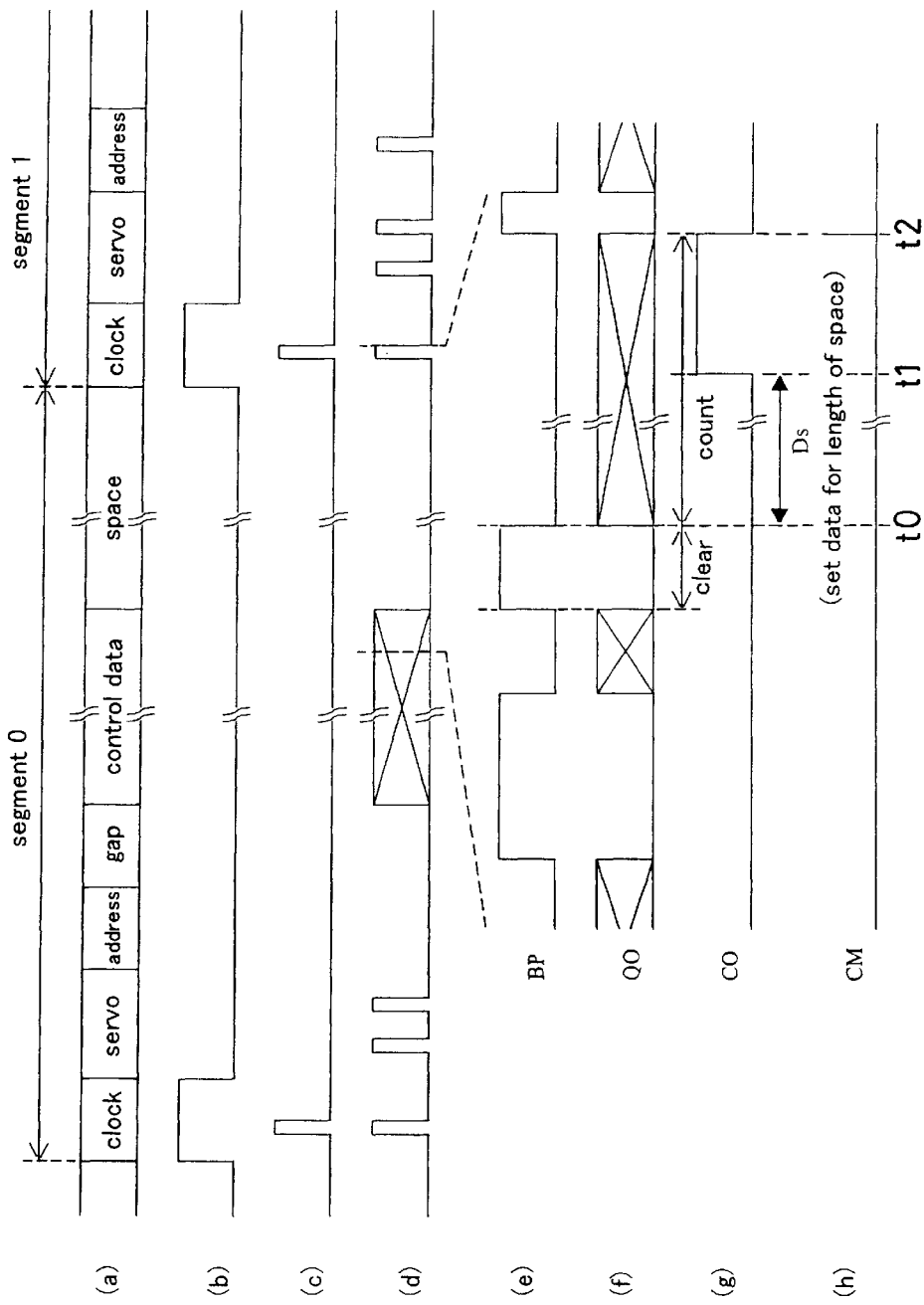
FIG. 5 is a waveform chart of each part in FIG. 4 matched with the segment structure.

When the magneto-optical disc 1 rotates a predetermined number of revolutions and the pit signal (PIT) is input from the RF Amp 4 to the clock mark detection circuit 11 in the focus-controlled state, a binary coding circuit 41 converts the pit signal into a binary digital signal (See FIG. 5(d) and FIG. 5(e), an enlarged view of one portion in FIG. 5(d)). The binary coded signal (BP) sent from the binary coding circuit 41 is input to a clear input of a counter 42. A clock signal (MCLK) also is input to the counter 42, and the counter 42 is cleared when the binary coded signal (BP) is a logic 1, and the counter 42 counts the clock signal (MCLK) when the binary coded signal (BP) is a logic 0 (time t0). A count value (QO) sent from the counter 42 is input to one of input terminals of a comparator 43, and set data (Ds) corresponding to the above-mentioned space length is fed into the other input terminal of the comparator 43. When the count value (QO) exceeds the set data (Ds) (time t1), the comparator 43 outputs a logic 1. An output signal (CO) from the comparator 43 (CO) is fed into one of the input terminals of an AND circuit 44, and the binary coded signal (BP) is fed into the other input terminal. Therefore, as shown in FIG. 5, at the output of the AND circuit 44, the position of a first prepit in a segment 1 following the space of a segment 0 will be detected (time t2).

In this way, when the prepit appearing after the space of a predetermined length is once detected, this prepit is used as a candidate for a clock mark (CM), and a detection window (FIG. 5 (b)) is arranged before and after a timing when the next clock mark shows up. When the prepit is detected in the detection window successively for a predetermined number of times, the system controller 21 judges that the detection of the clock mark is already established.

Here, the clock signal MCLK used for the detection of a clock mark may be a clock signal of a fixed frequency obtained from a crystal oscillator or the like. The set data (Ds) of the clock signal MCLK sent to the comparator 43 for a sufficiently long space can be determined unequivocally in the case of the CAV system, whereas in the case of the CLV system, when a maximum value of an admissible number of revolutions at the time when the spindle motor 2 is rotated in a free run is set, the length of time for this space can be used to determine the set data.

Therefore, when the control track area of the magneto-optical disc 1 is reproduced, the clock mark detection circuit 11 detects a space from the back end of a data area to a clock mark of the next segment and thus can specify the position of the clock mark. With the use of the detected clock mark, the PLL circuit 12 generates a servo clock SCLK synchronized with the clock mark, that is, synchronized with the rotational phase of the magneto-optical disc 1. In the case of the present embodiment, the PLL circuit 12 generates the servo clock SCLK by multiplying the frequency of the clock mark by 325 times. In other words, one segment, which is a distance between the clock marks, includes 325 SCB.

Next, the specified position of the clock mark and the generated servo clock SCLK are used by the Bi-Phase decoder 13 for obtaining a period of the data area where the control data are recorded by emboss prepits and bit cell information of the Bi-Phase code to perform a Bi-Phase demodulation. In the present embodiment, 3 SCB is set as 1 Bi-Phase bit, and 6 SCB is set as 1 control data bit. The control data after being demodulated by the Bi-Phase code are read out by the system controller 21 and managed as information for determining the operating conditions of the device for the magneto-optical disc 1.

The reproduction of the control data from this control track area can be performed without a tracking control when the system controller 21 and the servo processor 16 (servo control means) set the tracking control function of the actuator driver 17 and the traverse driver 18 in a non-operating state. This is because the same control data to be completed in 1 cycle are recorded in the plurality of tracks neighboring in the control track area. In the case of the present embodiment, the number of tracks where the control data are recorded amounts to several hundreds of tracks, and the same control data are recorded over a physical length of about 1 mm. Accordingly, the optical beam does not need to trace the control tracks on the magneto-optical disc 1 accurately any more, so that the control data can be read out in a short time only by performing a focus control.

In addition, the embodiment of the present invention referred to the case in which the control track area is provided in the vicinity of the inner circumferential end, but it is also possible to provide the control track area in the vicinity of the peripheral end and also both in the vicinity of the inner circumferential end and in the vicinity of the peripheral end. In this alternative embodiment, depending on the position of the control track area, the magneto-optical signals corresponding to the user data can be recorded and reproduced from the inner circumference to the periphery of the rewritable track area or from the periphery to the inner circumference, and alternatively in both directions.

What is claimed is:

1. An optical disc in which a plurality of concentric circular or spiral tracks are formed in a control track area where control data are recorded, in the vicinity of at least one selected from an inner circumferential end and a peripheral end, and in a rewritable area located outside the control track area for recording user data at least in one direction either from an inner circumference to a periphery or from the periphery to the inner circumference depending on the position of the control track area, the optical disc comprising a plurality of segments formed in each track, each segment including a clock area where a clock mark is arranged, a servo area where a pair of wobble marks displaced in both inner circumferential and peripheral directions from a center line of a track and separated by a predetermined distance in a circumferential direction, an address area where an address mark is arranged and a data area for recording the control data or the user data, wherein the clock mark, the wobble marks and the address mark are formed as prepits of an uneven shape, and, following the data area where the control data are recorded by the prepits of an uneven shape, a space of a predetermined length where the prepits do not exist is arranged for each segment in the control track area.

2. The optical disc according to claim 1, wherein same control data are recorded in a plurality of tracks neighboring in the control track area.

3. The optical disc according to claim 1, wherein the control data in the control track area are recorded by run-length-limited code.

4. The optical disc according to claim 1, wherein the predetermined length of the space is a length exceeding a distance between the servo mark and a first prepit of the control data in the control track area.

5. An optical disc device for driving an optical disc, in which a plurality of concentric circular or spiral tracks are formed in a control track area where control data are recorded, in the vicinity of at least one selected from an inner circumferential end and a peripheral end, and in a rewritable area located outside the control track area for recording user data at least in one direction either from an inner circumference to a periphery or from the periphery to the inner circumference depending on the position of the control track area, and a plurality of segments are formed in each track, each segment including a clock area where a clock mark is arranged, a servo area where a pair of wobble marks displaced in both inner circumferential and peripheral directions from a center line of a track and separated by a predetermined distance in a circumferential direction, an address area where an address mark is arranged and a data area for recording the control data or the user data, wherein the clock mark, the wobble marks and the address mark are formed as prepits of an uneven shape, and, following the data area where the control data are recorded by the prepits of an uneven shape, a space of a predetermined length where the prepits do not exist is arranged for each segment in the control track area, the optical disc device comprising reproduction means for reproducing pit signals corresponding to the prepits, clock mark detection means for detecting a pit signal following a distance of not less than a distance corresponding to the space length from the pit signals reproduced by the reproduction means as the clock mark, servo clock generating means for generating a servo clock synchronized with the clock mark detected by the clock mark detection means, and control data readout means for reading out the control data based on the servo clock.

6. The optical disc device according to claim 5, further comprising tracking control means for controlling a center of an optical beam spot to be emitted on the optical disc to match a center line of a track, based on the results of the pair of wobble pits reproduced by the reproduction means, and servo control means for setting the tracking control means in a non-operating state at the time when the control data is read out by the control data readout means, wherein the same control data are recorded in a plurality of tracks neighboring in the control track area of the optical disc.

7. The optical disc device according to claim 5, wherein the control data in the control track area of the optical disc are recorded by run-length-limited code, and the control data readout means comprises decoding means for decoding the control data recorded by the run-length-limited code.

* * * * *

UNITED STATES PATENT AND TRADEMARK OFFICE
CERTIFICATE OF CORRECTION

PATENT NO.    : 6,549,498 B1                                              Page 1 of 1
DATED         : April 15, 2003
INVENTOR(S)   : Inoue et al.

It is certified that error appears in the above-identified patent and that said Letters Patent is hereby corrected as shown below:

<u>Title page, Item [54] and Column 1, lines 1-2,</u>
Title should read -- OPTICAL DISC AND OPTICAL DISC APPARATUS --
rather than "OPTICAL DISK AND OPTICAL DISK APPARATUS"

Signed and Sealed this

Thirteenth Day of January, 2004

JON W. DUDAS
*Acting Director of the United States Patent and Trademark Office*